United States Patent [19]
Van Wijk

[11] Patent Number: 6,139,933
[45] Date of Patent: Oct. 31, 2000

[54] OPTICAL RECORDING MEDIUM COMPRISING A CROSS-LINKED BUFFER LAYER

[75] Inventor: Freddy Gerhard Hedrikus Van Wijk, Arnhem, Netherlands

[73] Assignee: Akzo Nobel N. V., Netherlands

[21] Appl. No.: 09/254,177

[22] PCT Filed: Sep. 2, 1997

[86] PCT No.: PCT/EP97/04883

§ 371 Date: Oct. 12, 1999

§ 102(e) Date: Oct. 12, 1999

[87] PCT Pub. No.: WO98/10416

PCT Pub. Date: Mar. 12, 1998

[30] Foreign Application Priority Data

Sep. 2, 1996 [EP] European Pat. Off. .............. 96202437

[51] Int. Cl.[7] ....................................................... B32B 3/02
[52] U.S. Cl. ...................... 428/64.1; 428/64.2; 428/64.4; 428/457; 428/913; 430/270.12; 430/495.1; 430/945; 369/275.1; 369/283; 369/288
[58] Field of Search ................................ 428/64.1, 64.2, 428/64.4, 457, 913; 430/270.12, 495.1, 945; 369/275.1, 275.4, 283, 288

[56] References Cited

U.S. PATENT DOCUMENTS 5,260,165 11/1993 Satou et al. .
5,485,452 1/1996 Maeda .

FOREIGN PATENT DOCUMENTS

| 0019329 | 11/1980 | European Pat. Off. . |
|---|---|---|
| 0337553 | 10/1989 | European Pat. Off. . |
| 0353391 | 2/1990 | European Pat. Off. . |
| 0455124 | 11/1991 | European Pat. Off. . |
| 0706178 | 4/1996 | European Pat. Off. . |
| 62-042343 | 2/1987 | Japan . |
| 9604650 | 2/1996 | WIPO . |
| 9616402 | 5/1996 | WIPO . |
| WO 9721216 | 6/1997 | WIPO . |

OTHER PUBLICATIONS

"Synthesis and Photopolymerization of Cholesteric Liquid Crystalline Diacrylates", Lub et al., Liquid Crystals, 1995, vol. 18 No. 2, 319–326.

"Synthesis and Photopolymerization of a Liquid–Crystalline Diepoxide", Broer et al., Macromolecules 1993, 26, 1244–1247.

Aniostropic Networks Obtained by in situ Cationic Polymerization of Liquid–Crystalline Divinyl Ethers, Hikmet et al., Polymer, 1993, vol. 34, No. 8, pp. 1736–1740.

*Primary Examiner*—Elizabeth Evans
*Attorney, Agent, or Firm*—Dilworth & Barrese

[57] ABSTRACT

The invention relates to an optical recording medium, in particular to a compact disc, comprising the following layers:
a) a transparent substrate with a spiral having an indented or protruding geometry; superposed by
b) a recording layer; optionally superposed by
c) a protective coating, wherein the recording layer comprises a partially transparent layer; superposed by a transparent buffer layer comprising a cross-linked material; superposed by a thick layer, said layers forming together a Fabry-Perot etalon.

20 Claims, No Drawings

OPTICAL RECORDING MEDIUM COMPRISING A CROSS-LINKED BUFFER LAYER

BACKGROUND OF THE INVENTION

The invention relates to an optical recording medium comprising a cross-linked buffer layer, a method for the manufacture thereof and an apparatus for the continuous manufacture of the same.

More particularly the invention relates to optical recording media such as compact discs (CDs) and digital tapes or cards, usually known as WORM media (write-once-read-many-times) and rewritable CDs and tapes. These media allow digital information such as data, music, and image, to be written by the user.

In conventional read-only CDs the information is stored in pits embossed in the disc. The reading is based on diffraction of reflected light on the regular pit structure. Interference of the diffracted orders is dependent on the position of the laser spot. This results in a modulation in reflection, which is used for reading the information. The conventional read-only CDs are only suitable for large-scale production as the production steps (for obtaining a written disc) are rather complicated and therefore only cost-effective in mass production. Hence there is need for CDs and digital tapes or cards which can be produced in smaller quantities or can even be written by the user himself. In EP-A2-0353391 an optical recording medium is described comprising a light-transmitting substrate having a deformable surface, a light-absorptive layer overlaying the deformable surface, and a light-reflective layer overlaying the light-absorptive layer, said deformable surface being deformable by energy generated upon absorption of the writing laser beam by the light-absorptive layer, to form optically readable pits. The reading is again based on pit-edge interference. During irradiation with the reading laser the light travels through the light-absorptive layer and is reflected by the reflective layer. As the refractive index within a pit differs from the refractive index outside it (land), the optical path length within the pit differs from that of the land. The laser light which falls within the pit interferes with the light which falls on the land. The resulting reflection modulation at this pit/land edge is used for reading the information. There is still need for improvement in reflectivity and contrast in the WORM media and rewritable media proposed so far. In our co-pending PCT patent application WO 96/16402 an optical recording medium is described which comprises a substrate provided with a partially transparent thin reflective layer, which is provided with a layer comprising liquid-crystalline material having a thickness between 100 and 1200 nm, which is provided with a thick layer having a reflectance over 50%. Thus, in comparison with the above-described optical recording media, an extra thin reflective layer is present, resulting in the liquid-crystalline material layer being sandwiched between two reflective layers. In this way a Fabry-Perot interferometer is created. The Fabry-Perot phenomenon is used to obtain a difference in reflection between the written and the unwritten state in the digital storage medium. Although a satisfactory contrast can be obtained with the concept described in application WO 96/16402, several problems still have to be solved. Some of these problems have been solved in co-pending, not yet published European patent application 95203502.0. It has now been found that substantial further improvements, in particular an improved writing contrast and an improved manufacturing process, can be obtained by applying a transparent buffer layer comprising a material which is capable of cross-linking, and an initiator which is preferably a photo-initiator.

SUMMARY OF THE INVENTION

In its most general concept the present invention relates to an optical recording medium comprising the following layers:
a) a transparent substrate with a spiral having an indented or protruding geometry; superposed by
b) a recording layer; optionally superposed by
c) a protective coating, wherein the recording layer comprises a partially transparent layer; superposed by a transparent buffer layer comprising a cross-linked material; superposed by a thick layer, said layers forming together a Fabry-Perot etalon.

The invention further comprises an article comprising the following layers:
a) a transparent substrate with a spiral having an indented or protruding geometry; superposed by
b) a partially transparent layer; superposed by
c) a transparent buffer layer comprising a material containing a compound capable of cross-linking and an initiator, optionally, superposed by
d) a thick metal layer, optionally, superposed by
e) a protective coating.

The present optical recording medium has many advantages over the known optical recording media and over those of the co-pending patent applications. The optical recording medium can be manufactured in an economical manner, shows an improved thermal stability, and above all has a surprisingly improved adhesion of the metal of the thick layer to the buffer layer. Moreover, as in the co-pending patent applications, the metal of the thick layer is not necessarily gold, but also cheaper materials as aluminum, silver, or alloys thereof can be used. The cross-linked buffer layer further improves the pit integrity and the pits are therefore better defined than in corresponding optical recording mediums having non-cross-linked buffer layers, resulting in improved writing properties.

By virtue of the partially transparent layer, the buffer layer and the thick layer a Fabry-Perot interferometer is created. Information can be written by deformation of one or more of the partially transparent layer, the buffer layer, the thick layer, and the substrate. The deformation results in changes of the Fabry-Perot reflection, and a decrease or increase of reflection occurs. The tracking (keeping the writing laser within the tracking means) can take place by employing the difference in amplitude and/or phase of the partially transparent layer/substrate interface within and outside the tracking means, resulting in diffraction, as will be explained in further detail below.

The term "transparent" as used in "transparent buffer layer" means that said buffer layer is transparent to the wavelength of the laser used for tracking and reading the optical recording medium, i.e. not more than about 20% of the light is absorbed by the buffer layer.

The term "tracking means" denotes a spiral track in the substrate which can have the geometry of a groove (indented) or dike (protruding), or is the groove image which is obtained in the buffer layer/thick layer interface, or else is a combination of both.

The term "thick" in "thick layer" means a thickness sufficient to provide 0 to 70%, and preferably 0 to 50% transmission of the incident light. In conventional CDs 0 to 5% transmission is preferred.

For convenience's sake, from now on the term CD will be used to refer to all optical recording media according to the invention, without restriction.

A Fabry-Perot interferometer typically consists of two parallel reflecting layers placed at some distance from each other. The reflectance of the Fabry-Perot interferometer as a function of the thickness of the buffer layer shows an oscillating behavior. The reflectance minimum depends on thelayer thickness and the complex reflective index of the partially transparent layer. The thickness of the buffer layer is chosen in such a manner that the reflectance from the land area is about the maximum reflectance of the CD. In the present invention the Fabry-Perot interferometer results from the partially transparent layer, the buffer layer, and the thick layer, and an additional mirror layer as is used in prior art writable CDs is not longer necessary. It is required that the thickness of the recording layer does not exceed the focus depth of the light source used. For diode lasers as used in recording and playing media this is typically less than 5 µm.

DESCRIPTION OF THE PREFERRED EMBODIMENTS

It is preferred for the recording medium according to the invention to be in the high reflective state of Fabry-Perot with a reflectance above 50% in the unwritten state from the groove or dike and a reflectance above 60% from the land, because conventional CD-players need about 20% background reflection from the groove or dike in the written state for tracking, and the CD-standard demands 60% writing contrast. Once CD-players requiring smaller background reflection become available, lower reflectance than 50% can be employed. A reflection above 20% in the unwritten state from the groove or dike and a reflectance above 25% from the land is then preferred. Upon writing the Fabry-Perot is detuned by deformation of one or more of the partially transparent layer, the buffer layer, the thick layer, and the substrate, resulting in a decrease of the reflection by at least 10%, and preferably by at least 40% of the unwritten state. For DVD-R media it is also possible to apply a Fabry-Perot etalon tuned for low reflection from the groove in the unwritten state, which changes into a high reflective state after recording.

In the conventional read-only CDs the recorded information is stored in a spiral track in which regions of low reflectance (pits) are alternated with regions where the background reflectance (land) is higher than 60%. The pit length varies from 0.9 to 3.3 µm in 0.3 µm steps. In the longest pits (generating the 11T signal) the reflectance must drop to below 40% of the background reflectance. The read-out laser in a conventional CD player has a wavelength between 780 and 830 nm, in general 780±10 nm. In order to be compatible with the read-only CD, a CD according to the invention should have a reflectance in the unwritten state of at least 60%, and the reflectance in the longest pit should be below 40% of the background reflectance when using a conventional read-out laser for CD players. The present invention provides CDs having parameters which, after recording, can be set to make the CD compatible with the conventional read-only CD (hereinafter referred to as the CD standard). In the known DVD-type compact discs the information is stored in spiral tracks in which regions (pits) of lower and higher reflection are present. These regions can be read by using focused laser light of 650±10 nm. The beginning and the end of each pit is recognized as a rapid change of the reflectance. The present invention provides CDs having parameters, which, after recording, can be set to make the CD compatible with the known DVD-type compact discs.

The buffer layer comprises materials containing compounds capable of cross-linking. Suitable compounds capable of cross-linking are known in the art. Preferred compounds have functional groups, and are optionally mixed with mono- and/or multifunctional compounds to control the rheology during processing and the cross-link density. Condensation mono-, oligo- and polymers and radically polymerizing mono-, oligo- and polymers having functional groups capable of cross-linking can be used. The suitable compounds can form at least two bonds through their functional groups. Examples are (di)acrylates, (di) epoxides, (di)vinyl ethers, and diols which can be converted into polymeric networks. Particularly interesting compounds are low-molecular weight monomers of the acrylic type, for instance such as disclosed by Lub et al., *Liquid Crystals,* 1995, Vol. 18 (2), 319–326, which is incorporated by reference. The skilled person will know how to choose other suitable compounds which are known in the art. To the low-molecular weight mono-, oligo-, or prepolymers, for instance an acrylate or methacrylate monomer, a few percent of an initiator (usually 1–5%), preferably a photo-initiator such as Irgacure 651®, diphenyliodonium hexafluoroarsenate, ferrocenium salts, or other known initiators, or combinations thereof, are added. The photo-initiated polymerization occurs in situ and is performed by irradiation of the monomers during a few seconds to a few minutes, for instance by UV radiation (typically 250–400 nm; 0.1–12 mW/cm$^2$) or light (typically 400–500 nm). This process is well-known in the art, see for instance Broer et al., *Macromolecules,* 1993 (26), 1244–1247 and Hikmet et al., *Polymer,* 1993, Vol. 34 (8), 1736–1740, which are incorporated by reference. The initiator may also be a thermal initiator, for example, AIBN (azoisobutyronitrile) or Trigonox B® (di-tert-butylperoxide).

To apply the buffer layer, the low molecular weight material and optionally other additives are preferably dissolved in a suitable solvent and spin-coated. Additives are, for instance, adhesion promoting agents, exothermally or endothermally decomposing agents for controlling and improving the recording properties, and colorants for fine-tuning of the optical thickness of the buffer layer. The optical thickness is defined by the product of the refractive index and the physical thickness of the buffer layer. Further, recording light absorbing agents may be used as an additive for fine-tuning the heat effects during recording, which results in optimal pit dimension, integrity, and recording sensitivity.

Other conventional means of applying coatings with accurate thickness may also be employed. Preferably the cross-linkable buffer layer is obtained by spin-coating. By selecting the right monomer viscosity and solids content the desired layer thickness and layer quality are guaranteed. After spin-coating the buffer layer is heated or irradiated to effect cross-linking of the material. By using a proper combination of the spin-coating procedure and spin-coat solution and a specifically selected track geometry in the substrate a groove image is obtained which is optimal for tracking. The invention further comprises a method of tracking using said groove image. The track geometry is the depth, height, and width of the groove or dike, comprising U- and V-shaped tracks. By using a cross-linkable buffer layer the simultaneous optimization of the buffer layer's quality and thickness, and of the groove image depth, is facilitated because more degrees of freedom have become available. The number of cross-linkable groups and the relative percentage of initiator determine the cross-link density of the buffer layer and thus the Tg and the modulus of the cross-linked buffer layer. These properties affect the amount and type of deformation that can be obtained during writing.

The optical recording medium according to the invention comprises a substrate with a spiral having an indented or protruding geometry. The medium is read through the substrate. Therefore, the substrate should be optically transparent to the laser light used for reading and writing. In conventional CD players laser light with a wavelength of 780 nm is used. Suitable substrates which are optically transparent at this wavelength and have sufficient thermal stability and resistance to humidity are polycarbonates, amorphous polyolefins (APO), poly(methylmethacrylates) (PMMA), and glass. Polycarbonate substrates are preferred for their price and ease of handling. Further, the properties of polycarbonate substrates are within the CD standard. Amorphous polyolefins also have properties which lie within the CD standard, but these substrates are more expensive than polycarbonates. However, polycarbonate is susceptible to chemical attack by almost every solvent normally used for applying the buffer layer material. With the CD according to the present invention this problem is circumvented because the partially transparent layer protects the substrate from solvent attack if this layer is thick enough. Thus, a broad choice of solvents can be used. Accordingly, in the case of the CD according to the invention, polycarbonate can be readily used as a substrate. For high density CDs the substrate has to be transparent in the wavelength area of 610 to 700 nm. For ultra-high density CDs, the substrate must also be transparent at wavelengths shorter than 610 nm.

As mentioned above, a substrate with a spiral having an indented or protruding geometry is used for the CD according to the invention. Such a tracking means preferably takes the form of a spiral-shaped groove which is molded in the substrate. This track is used to control the laser spot position during reading and writing. As the partially transparent layer has an index of refraction which is different from that of the substrate, the tracking can be done via the interference and diffraction caused by the difference in reflected amplitude or phase from that of the partially transparent layer/substrate interface within and outside the groove. As regards the tracking the geometry of the track is decisive. Usually a track width of 0.1–1.2 μm, and preferably of 0.3–0.6 μm, is used for conventional CDs. For recordable DVD media, a track width of 0.15–0.45 μm is preferred. The track depth or height is an important parameter which has to be chosen in relation to the thickness of the buffer layer and the partially transparent layer, and is usually in the range of 20–400 nm. It was found that a relatively shallow track depth of 50 nm in combination with a buffer layer thickness of 285 nm and an aluminum partially transparent layer of 7 nm, or in combination with a buffer layer thickness of 220 nm and a silicon partially transparent layer of 50 nm, results in an optimal tracking contrast while preserving the reflection properties. It is also possible to obtain optimal tracking conditions with a track depth of more than 100 nm.

In order to reduce the loss of laser light by reflection at the air/substrate interface, the substrate may be provided with an anti-reflection structure on the side not covered with the thick layer.

For the partially transparent layer both metals and non-metal materials can be employed as long as the layer can be made thin enough to be partially transparent to the laser light. This is usually in the range of 0.3–30 nm. The layer thickness of the partially transparent layer can be expressed as a percentage of the light passing this layer as applied onto the transparent substrate on one side, and with air on the other side. The thickness of the partially transparent layer should preferably be between 25% and 90% as measured with light having a wavelength about equal to the wavelength of the light used for recording or read-out of the CD. A substrate without a partially transparent layer should have a normalized transmission of 100%. Metals usually have a high imaginary part of the index of refraction. This means that they are both highly reflective when used in a transparent environment (such as air and polycarbonate) and absorptive. Accordingly, upon writing with a laser the laser light is reflected (tracking) and absorbed by the partially transparent metal layer. The absorbed laser light is converted into heat, and deformation of one or more of the partially transparent layer, the buffer layer, the thick layer, and the substrate occurs. Suitable metal materials for the partially transparent layer are aluminum, tantalum, gold, silver, nickel, iron, titanium, chromium, vanadium, nickel-gold, nickel-vanadium, nickel-chromium, and other alloys. Preferred are gold, aluminum, nickel, tantalum, vanadium, chromium, or alloys thereof. It is preferred that the metals used have a relatively low heat conductivity, in order to preserve the pit integrity. Suitable non-metal materials are, for instance, silicon, silicon nitride, silicon germanium, silica, $SiO_x$, SiO-germanium, etc. This type of material usually has a high real part of the index of refraction and a small imaginary part. This means that the material is moderately reflective, but hardly absorptive. Upon writing with a laser on CDs with this type of partially transparent layer, the laser light is reflected by the partially transparent layer, but the absorption of the laser light will have to take place in the buffer layer. Thus, when employing a partially transparent non-metal layer in the CD according to the invention or a very thin partially transparent metal layer (having more than 35% transmission), it is preferred to use an absorptive buffer layer or a thick partially transparent non-metal layer, for instance thicker than 30 nm. Especially preferred are germanium, silicon germanium alloys, and silicon because of their high real parts of indices of refraction. The partially transparent layer may be applied onto the substrate by any conventional method normally used in the field such as vacuum deposition, electron beam deposition, and sputtering.

The thick layer is preferably a metal layer such as gold, aluminum, silver, copper, chromium, nickel, platinum, alloys such as aluminum-titanium, copper-aluminum, gold-aluminum, etc. superposed on the buffer layer by, for instance, chemical vapor deposition, or sputtering. This thick layer should not be transparent to the laser light. As aluminum and silver are cheaper than gold, and the reflectivity of an aluminum or silver layer with a thickness above 30 nm is sufficiently high, the use of aluminum, silver or alloys thereof for the thick layer is preferred.

The protective coating can be any resin having a good impact resistance. Usually a UV curable resin is used, which is applied by spin-coating, followed by UV irradiation for curing. Other suitable materials for the protective coating are epoxy resins, acrylate resins, silicone hard coat resins or urethane resins. The thickness of the protective coating is usually not critical and is usually within the range of 1 to 30 μm, preferably 5 to 15 μm.

If so desired, in order to enhance the deformation in the thick layer, a deformable layer, for instance a low-modulus organic polymer of high-molecular weight, can be used between the thick layer and the protective coating.

The invention is further directed to a method for the manufacture of an article according to the invention. Said method comprises the steps of applying a partially transparent layer onto a substrate with a spiral having an indented or protruding geometry, and applying onto said partially transparent layer a buffer layer comprising a material containing a compound capable of cross-linking, and an initiator.

This article can be further manufactured into the optical recording medium according to this invention by above-mentioned method, followed by activation of the initiator in order to cross-link the transparent buffer layer; applying onto said buffer layer a thick layer, and optionally applying a protective coating onto said thick layer.

As mentioned-above, the partially transparent layer and thick layer can be applied by, for instance, vacuum deposition, electron beam deposition, or sputtering. The buffer layer can be applied by, for instance, spin-coating, sputtering, and the like.

This method of manufacture can easily be made into a continuous process. An apparatus for the manufacture of conventional read-only CDs can easily be adapted to the fabrication of the optical recording medium according to the invention by inserting means for applying the partially transparent layer, as well as means for applying the buffer layer, into the conventional line. The invention is also directed to an apparatus for the continuous manufacture of an optical recording medium according to the invention comprising means for transporting a substrate with a spiral having an indented or protruding geometry (1), means for applying a partially transparent layer onto said substrate (2), means for applying a buffer layer comprising a compound capable of cross-linking, and an initiator onto said partially transparent layer (3), means for curing the buffer layer (4), means for applying a thick layer onto said buffer layer (5), and optionally means for applying a protective coating (6). Said apparatus may further have guiding means between means (2) and (3), means (3) and (4), means (4) and (5), and means (5) and (6).

The invention is further illustrated by the following examples.

EXAMPLE 1

Difunctional aliphatic urethane acrylate (3.74 g) as a dilution in 20% TPGDA (tripropyleneglycol diacrylate) (Actilane® 200TP20; Akros Chemicals) and photo-initiator Irgacure 369 (83.5 mg; Ciba-Geigy; 2-benzyl-2-dimethylamino-1-(4-morpholinophenyl)-butanone-1) were dissolved in 21.4 ml of a mixture of 4-hydroxy-4-methyl-2-pentanone and n-butanol 9:1 (w/w), and the solution was filtered over a 0.2 μm filter. This solution was used in the following step (Example 2).

EXAMPLE 2

A thin aluminum film of 10 nm thickness was deposited on a 1.2 mm thick polycarbonate substrate having a pre-groove with a depth of 170 nm and a width of 0.5 μm and a track pitch of 1.6 μm. On said thin aluminum layer a buffer layer was spin-coated from a solution according to Example 1. The thickness of the buffer layer was 250 nm. If desired, the layer was dried at 60° C. on a hot plate, and thereafter purged for 1 min with nitrogen. Under further purging with nitrogen the layer was irradiated with UV light (4.5 mW/cm$^2$ at 365 nm) for 1 min. Onto said buffer layer a 100 nm thick aluminum layer was vacuum-deposited. After drying in a vacuum oven at 40° C., a protective layer of UV curable epoxyacrylate resin was spin-coated thereon and cured. The resulting CD was evaluated using an evaluation equipment employing a laser beam of 780 nm. A signal to noise ratio (CNR) of 51 dB was obtained by 1.3 m/sec, 720 kHz and 8 mW recording conditions, and a reflectivity of 72% was obtained in the land and a reflectivity of about 50% was obtained in the track with 0.7 mW read-out power. The disc appeared to be replayable in a compact disc player and the disc appeared to satisfy the specifications of the CD standard.

EXAMPLE 3

The mixture of Example 1 was mixed in a 1:1 ratio with a solution of poly(methylmethacrylate) with an average Mwt of 4800 D in 4-hydroxy-4-methyl-2-pentanone and n-butanol (9:1). 9.5 wt % of this solution was spin-coated onto a CDR substrate with 185 nm deep grooves and a 400 nm groove width which was coated with an 8 nm thick aluminum metal layer. After spin-coating the organic layer was illuminated by a low-power mercury lamp (250 W, 4.5 mW/cm2 at 365 nm) for 1 minute to cure it.

After drying an 80 nm thick aluminum reflective layer was sputtered onto the organic layer, and finally a protective layer (UV curable epoxyacrylate resin) was applied onto the reflective layer and also cured.

The resulting CD-R was recorded using a commercially available CD-R-recorder (Yamaha) and subsequently evaluated. A CNR value of more than 47 dB was obtained, compliant with the CD standard.

When this disc was analyzed it was attempted to remove the protective and reflective layers by sticking an adhesive tape (Scotch) onto the protective layer and subsequent pulling. The tape gave way from the protective layer surface, the CD was unaffected.

COMPARATIVE EXAMPLE 4

A CD was made according to Example 3, except that the organic layer consisted of pure PMMA, i.e. no cross-linkable agent was used. Evaluation of the disc showed bad jitter values and low (34 dB) CNR values.

The adhesive tape test (see example 3) resulted in the removal of the combined reflective and protective layer.

EXAMPLE 5

A spin-coat solution was made consisting of a 20 wt % of Actilane 200TP20 (see Example 1), and 10 wt % of the dye Victoria Blue R (Aldrich) in 4-hydroxy-4-methyl-2-pentanone. The disc was made according to the procedure described in Example 3. Recording resulted in optically readable pits.

EXAMPLE 6

A CD-R was made according to the method described in Example 3, the mixture further containing 20 wt % of dianolacrylate (DA 121, Akzo Resins), the total solids content of the spin-coat solution being 13 wt %. The method also differed from Example 2 in that the substrate had 185 nm deep grooves instead of 230 nm deep grooves.

The disc obtained was recorded using a commercial CD-R recorder (Yamaha). Evaluation showed optically readable pits. The writing contrast (reflection before and after recording) was of the opposite sign of that of conventional CD-Rs, i.e. the reflection after recording was higher than before.

EXAMPLE 7

A CD-R was made according to the method described in Example 3, differing in that the solution described in Example 1 contained 30 wt % of TPGDA instead of 20 wt % (TMPTA: trimethylolpropanetriacetate, Akzo Resins). The disc further differed from Example 3 in that the substrate used had 70 nm deep grooves instead of 185 nm deep grooves.

The disc was recorded using a commercial CD-R recorder (Yamaha). Evaluation showed optically readable pits and reverse writing contrast (as explained in Example 6).

EXAMPLE 8

A CD-R was made according to the method described Example 7 using 10 wt % of TMPTA instead of 30 wt %. Evaluation of the recorded disc showed optically readable pits and reverse writing contrast.

What is claimed is:

1. An optical recording medium comprising the following layers:
    a) a transparent substrate with a spiral having an indented or protruding geometry; superposed by
    b) a recording layer; optionally superposed by
    c) a protective coating, wherein the recording layer comprises a partially transparent layer; superposed by a transparent buffer layer comprising a cross-linked material; superposed by a thick layer, said layers forming together a Fabry-Perot etalon.

2. The optical recording medium of claim 1 wherein the partially transparent layer comprises aluminum, nickel, tantalum, or alloys thereof.

3. The optical recording medium of claim 2 wherein the thick layer comprises aluminum, silver, gold, copper, or alloys thereof.

4. The optical recording medium of claim 2 wherein the substrate comprises polycarbonate.

5. An article suitable for the manufacture of the optical recording medium of claim 2 comprising the following layers:
    a) a transparent substrate with a spiral having an indented or protruding geometry; superposed by
    b) a partially transparent layer; superposed by
    c) a transparent buffer layer comprising a material containing a compound capable of cross-linking, and an indiator.

6. The optical recording medium of claim 1 wherein the thick layer comprises aluminum, silver, gold, copper, or alloys thereof.

7. The optical recording medium of claim 6 wherein the substrate comprises polycarbonate.

8. An article suitable for the manufacture of the optical recording medium of claim 6 comprising the following layers:
    a) a transparent substrate with a spiral having an indented or protruding geometry; superposed by
    b) a partially transparent layer; superposed by
    c) a transparent buffer layer comprising a material containing a compound capable of cross-linking, and an initiator.

9. The optical recording medium of claim 1 wherein the substrate comprises polycarbonate.

10. An article suitable for the manufacture of the optical recording medium of claim 9 comprising the following layers:
    a) a transparent substrate with a spiral having an indented or protruding geometry; superposed by
    b) a partially transparent layer; superposed by
    c) a transparent buffer layer comprising a material containing a compound capable of cross-linking, and an initiator.

11. An article suitable for the manufacture of the optical recording medium of claim 1 comprising the following layers:
    a) a transparent substrate with a spiral having an indented or protruding geometry; superposed by
    b) a partially transparent layer; superposed by
    c) a transparent buffer layer comprising a material containing a compound capable of cross-linking, and an initiator.

12. The article of claim 11 wherein the transparent buffer layer comprises one or more monomers or oligomers and an initiator.

13. The article of claim 12 wherein the monomer is of the acrylic type.

14. The article of claim 12 wherein the initiator is a photo initiator.

15. The article of claim 11 wherein the initiator is a photo-initiator.

16. The article of claim 11, further comprising one or more additives selected from an adhesion promoting agent, an exothermally or endothermally decomposing agent, and a recording light absorbing agent.

17. A method for the manufacture of an article according to claim 11 comprising the steps of:
    applying the partially transparent layer onto the substrate with a spiral having an indented or protruding geometry; and
    applying onto said partially transparent layer the buffer layer comprising a material containing a compound capable of cross-linking, and an initiator.

18. A method for the manufacture of an optical recording medium according to claim 10, further comprising the steps of followed by activation of the initiator in order to cross-link the transparent buffer layer; applying onto said buffer layer a thick layer, and optionally applying a protective coating onto said thick layer.

19. An apparatus for the continuous manufacture of an optical recording medium according to claim 1 comprising means for transporting a substrate with a spiral having an indented or protruding geometry (1), means for applying a partially transparent layer comprising a compound capable of cross-linkage, and an initiator onto said substrate (2), means for applying a buffer layer onto said partially transparent layer (3), means for curing the buffer layer (4), means for applying a thick layer onto said buffer layer (5).

20. The apparatus of claim 19 further comprising means for applying a protective coating onto the thick layer.

* * * * *